US008693820B2

(12) United States Patent
Okayama

(10) Patent No.: US 8,693,820 B2
(45) Date of Patent: Apr. 8, 2014

(54) FLAT OPTICAL WAVEGUIDE WITH CONNECTIONS TO CHANNEL AND INPUT OPTICAL WAVEGUIDES

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 116 days.

(21) Appl. No.: 13/436,049

(22) Filed: Mar. 30, 2012

(65) Prior Publication Data

US 2012/0251040 A1   Oct. 4, 2012

(30) Foreign Application Priority Data

Mar. 30, 2011   (JP) ................................. 2011-074497

(51) Int. Cl.
*G02B 6/26* (2006.01)
*G02B 6/34* (2006.01)

(52) U.S. Cl.
USPC .............................................. 385/22; 385/37

(58) Field of Classification Search
USPC .................................................... 385/22, 37
See application file for complete search history.

(56) References Cited

U.S. PATENT DOCUMENTS 5,212,758 A * 5/1993 Adar et al. ..................... 385/129
6,069,990 A * 5/2000 Okawa et al. ................... 385/43
6,665,466 B2 * 12/2003 Katayama ........................ 385/24
7,702,200 B2 * 4/2010 Dragone .......................... 385/37
2002/0181832 A1 * 12/2002 Feng et al. ....................... 385/15
2003/0007728 A1 * 1/2003 Uetsuka et al. ................... 385/37
2003/0031412 A1 * 2/2003 Payne et al. ..................... 385/37
2006/0215960 A1 * 9/2006 Tabuchi .......................... 385/37
2009/0154880 A1 * 6/2009 Song et al. ...................... 385/46

FOREIGN PATENT DOCUMENTS

JP          06289449 A   * 10/1994
JP      2001-159718 A      6/2001

OTHER PUBLICATIONS

W. Bogaerts, "Silicon-on-Insulator Spectral Filters Fabricated With CMOS Technology", IEEE Journal of Selected Topics in Quantum Electronics, vol. 16, No. 1, 33-44, Jan.-Feb. 2010.

* cited by examiner

*Primary Examiner* — Charlie Peng
(74) *Attorney, Agent, or Firm* — Rabin & Berdo, P.C.

(57) ABSTRACT

An optical waveguide includes a substrate, an upper clad layer arranged on the substrate; and an optical waveguide structure that is disposed in the upper clad layer so as to be parallel to a surface of the substrate. The optical waveguide structure includes a flat optical waveguide, channel optical waveguides that are each connected with a first edge face of the flat optical waveguide and extend radially therefrom, the channel optical waveguides each respectively have lateral sides parallel to the substrate surface that have a width therebetween which increases as the distance from the first edge face increases, and an input optical waveguide connected with a second edge face that is arranged at an side of the flat optical waveguide opposite to the first edge face.

6 Claims, 5 Drawing Sheets

FLAT OPTICAL WAVEGUIDE WITH CONNECTIONS TO CHANNEL AND INPUT OPTICAL WAVEGUIDES

CROSS-REFERENCE TO RELATED APPLICATION

This application claims priority under 35 U.S.C. §119 from Japanese Patent Application NO. P 2011-074497, filed on Mar. 30, 2011, the disclosure of which is incorporated herein by reference.

BACKGROUND OF THE INVENTION

1. Field of the Invention

This application relates to the art of optical waveguides that may include a flat optical waveguide connected with channel optical waveguides, and that may reduce optical leakage from a clearance gap of a bonding face between a channel optical waveguide and a flat optical waveguide.

2. Description of the Related Art

Related art that uses Silicon (Si) as a waveguide material is useful for downsizing and mass production of optical circuits. In a Si photonic wire line optical waveguide, the entire circumference of the core of the Si is covered with a cladding of silicon dioxide ($SiO_2$). The difference in the index of refraction respectively of the core (e.g., Si) and cladding (e.g., $SiO_2$) is large enough that the Si photonic wire optical waveguide may guide optical signals with relatively small size. The Si photonic wire optical waveguide may also curve so as to bend an optical signal in a small radius of curvature of approximately 1 μm. This small radius of curvature is made possible by the core-cladding refractive index difference. The Si photonic wire optical waveguide may also have a submicron cross section structure that is small, because the Si photonic wire optical guide may be manufactured using processing techniques associated with Silicon electronic device.

Japanese Laid-Open Patent No. 2001-159718, and the publication, Journal of Selected Areas in Quantum Electronics, vol. 16, p. 33, 2010, describe a wavelength separation element as an application example of the Si fine line optical waveguide. The wavelength separation element described in this literature is called a "Arrayed Waveguide Grating (AWG)". The AWG may be configured by a flat optical waveguide connected to channel optical waveguides. In the AWG that uses the Si photonic wire optical waveguide, there is a problem that many optical leaks occur at clearance gaps formed between edges of the channel optical waveguides adjacent the flat optical waveguide and the flat optical waveguide.

In the publications discussed above, the channel optical waveguide has a taper shape in the thickness direction thereof to prevent optical leakage. However, the AWG described by the publications must form a base plate in the thickness direction thereof, so that both the structure and manufacturing process of the channel optical waveguide are complex.

SUMMARY OF THE INVENTION

An object of the application is to disclose an optical waveguide capable of decreasing loss of in an optical signal that propagates the optical waveguide.

According to one aspect, an optical waveguide may include a substrate, an upper clad layer arranged on the substrate; and an optical waveguide structure that is disposed in the upper clad layer so as to be parallel to a surface of the substrate. An optical waveguide structure may include a flat optical waveguide whose first edge face is connected to each of a plurality of channel optical waveguides that are extend radially therefrom. The channel optical waveguides each have respective lateral sides perpendicular to the substrate surface that define a channel width therebetween which increases as the distance from the first edge face of the flat optical waveguide increases. The optical waveguide structure also includes an input optical waveguide connected with a second edge face of the flat optical waveguide that is opposite the first edge face.

BRIEF DESCRIPTION OF THE DRAWINGS

The optical waveguide will be more fully understood from the following detailed description with reference to the accompanying drawing, which is given by way of illustration only, and is not intended to limit the invention, wherein.

DETAILED DESCRIPTION OF THE INVENTION

Figure 1A:
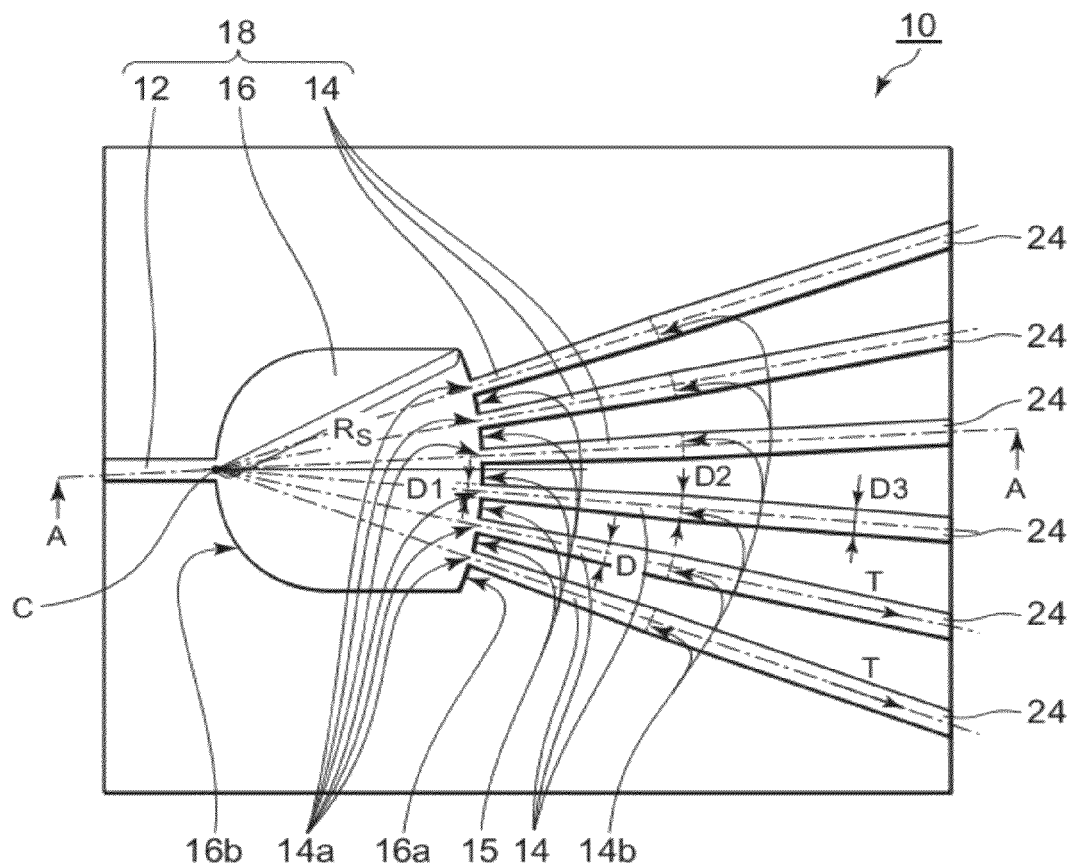
FIG. 1A is a schematic plan view that illustrates a composition of an optical waveguide device.

The optical waveguide will be described with reference to FIGS. 1A to 5 of the drawings. In the drawings, configurations, dimensions, and alignments of composition elements are illustrated generally for understanding the embodiment. Described materials and numerical conditions are merely exemplary. In the drawings, common alignments of compositions may be designated by the same reference characters, and an explanation thereof is occasionally omitted.

Configuration

Figure 1B:
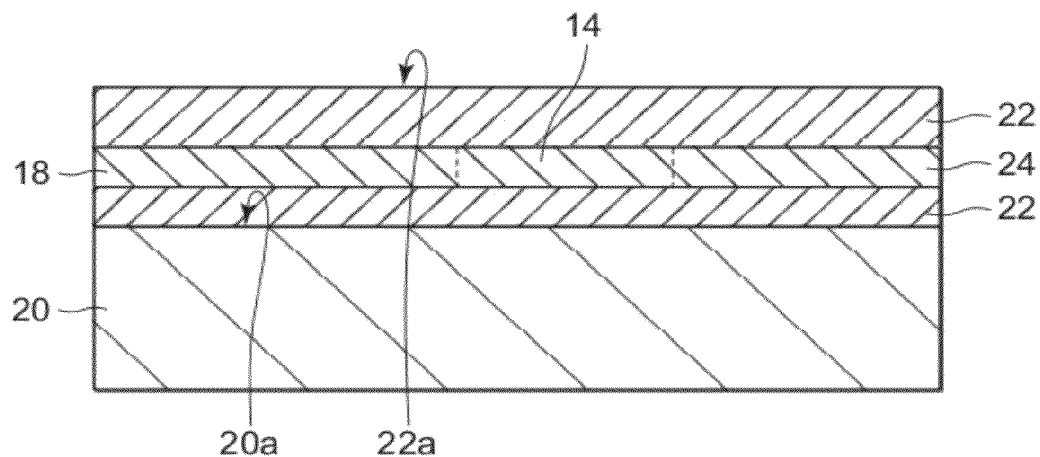
FIG. 1B is a cross-sectional view of the optical waveguide device as seen along line A-A of FIG. 1A.

Referring to FIGS. 1A and 1B, the optical waveguide device 10 may include an optical waveguide structure 18 that includes an input optical waveguide 12, channel optical waveguides 14, a flat optical waveguide 16, straight optical waveguides 24, a substrate 20, and an upper clad layer 22. First edges 14a of the channel optical waveguides 14 are connected with first edge faces 16a of the flat optical waveguide 16 and extend radially outward along equiangularly space radial lines originating at a point C centrally located on a second edge face 16b of the waveguide 16. Thus, the waveguides 14 are equally spaced apart at the first edge faces and remain so as they extend radially outward, and have lateral cross sections that increase in the radially outward direction. Second edges 14b of the channel optical waveguides 14 are connected with edges of the respective straight optical waveguides 24. An edge of each input optical waveguide 12 is connected with a second edge face 16b of the flat optical waveguide 16.

The substrate 20 is plate-shaped, and a principal surface 20a thereof is flat. The substrate 20 is formed of a single crystal Silicon (Si), and has a thickness of approximately 600 νμm.

The upper clad layer 22 is provided on the principal surface 20a. In some embodiments, the thickness of the upper clad layer 22 does not vary, and is approximately 4 um. The optical structure 18 and the straight optical waveguides 24 are disposed in the upper clad layer 22 so as to be parallel to the principal surface 20a, and are each covered on an entire circumference thereof by the upper clad layer 22. As illustrated in FIG. 1B, the upper clad layer 22 covers and touches both the top and bottom portions of each of the optical structures 18 and the straight optical waveguides 24. Further, while not illustrated, the upper clad layer 22 may surround and enclose the optical structure 18 and the straight optical waveguides 24.

The optical waveguide structure 18 and the straight optical waveguides 24 are not seen directly when looking at the optical waveguide device 10 since they are covered by the upper clad layer 22. However, in FIG. 1A the optical waveguide structure 18 and the straight optical waveguides 24 are drawn in solid line to emphasize the structure.

In this embodiment, the material of the upper clad layer 22 is Silicon Dioxide ($SiO_2$), and its refractive index is approximately 1.45. The optical waveguide structure 18, the input optical waveguides 12, the channel optical waveguides 14, and the flat optical waveguide 16 may include materials that are all formed of single crystal Si, and the refractive index thereof is approximately 3.47. In this case, the refractive index of the optical waveguide 18 is approximately 2.39 times greater than the refractive index of the upper clad layer 22. The refractive index of the upper clad layer 22 is approximately 42% of the reflective index of the optical waveguide structure 18. As is well known in the art the refractive index of an upper clad layer is preferably equal to or less than 60% of refractive index of a optical waveguide structure. This embodiment satisfies that numerical preference.

The optical waveguide structure 18 has a uniform thickness of approximately 300 nm. As described above, the optical waveguide structure 18 is disposed in the upper clad layer 22, and the thickness of the part of the upper clad layer 22 that covers the optical waveguide structure 18 is approximately 2 μm. Thus, the optical waveguide 18 is positioned approximately 2 μm from an upper surface 22a of the upper clad layer 22.

The second edge face 16b of the optical waveguide 16 may be arranged at an opposite end from the first edge face 16a. The first edge face 16a may be arc-shaped. Therefore, first edge lines of the first edge face 16a that contact the upper clad layers 22 arranged over and under the flat optical waveguide 16, are similarly arc-shaped. Further, the shape of the second edge face 16b may be arc-shaped. Therefore, second edge lines of the second edge face 16b that contact the upper clad layers 22 over and under the flat optical waveguide 16, also are arc-shaped. As clearly shown in FIG. 1A, the radius of a circle formed by the arc of the second edge face 16b is smaller than the radius of a circle that is formed by the arc of the first edge face 16a.

An optical signal propagates through channel optical waveguides 14. The optical signal is input from the input optical waveguide 12 and propagates through the flat optical waveguide 16 towards the channel optical waveguides 14. The optical signal is distributed equally among the optical waveguides 14 and propagates in an optical propagation direction T. Thus, the optical intensity of the signals in the optical waveguides 14 is less than that the original optical signal prior to being split.

At the connection points between the flat optical waveguide 16 and the channel optical waveguides 14, there are clearance gaps 15 that have a certain amount of a width. Various parts of the first edge face 16a are exposed at the clearance gaps 15. It is preferred that the width of each of the clearance gaps 15 is 0 nm to prevent the optical leakage from the clearance gaps 15. However, in fact, a width of 0 nm is difficult to obtain. The width of the clearance gaps 15 is determined inevitably by limits of processing accuracy of the single crystal Si of the optical waveguide 18. Therefore the width may be approximately 200 nm.

A width D of each channel optical waveguide 14 gradually broadens as the distance from the flat optical waveguide 16 increases. The width D is measured in a direction perpendicular to the waveguide's optical propagation direction T, and means a length of the channel optical waveguide 14 in a direction parallel to the principal surface 20a. The width D is the same for all the channel optical waveguides 14.

Here, a first width D at a bonding face of the channel optical waveguide 14 and the flat optical waveguide 16 at the first edge 14a is termed "D1", and a second width D at the second edge 14b is termed "D2". The relationship of the widths D1 and D2 is "D1<D2", because the width D of the channel optical waveguide 14 gradually broadens with increasing distance from the flat optical waveguide 16. In this embodiment, the width D1 may be approximately 330 nm, and the width D2 may be approximately 800 nm.

As will hereinafter be described in detail, it may be possible to reduce the optical leakage from the clearance gaps 15 by selecting how the width D gradually broadens with increasing distance from the flat optical waveguide 16.

For instance, the width D1 may be less than the wavelength of a propagating optical signal. The width D1 also is determined so that the value of the integral of an optical intensity of the channel optical waveguides 14 at the first edge 14a is equal to its value at the clearance gaps 15. The width D2 is determined so that a value of an integral of an optical intensity of the channel optical waveguide 14 at the second edge 14b is one and a half times more than its value at the clearance gaps 15.

The input optical waveguide 12 inputs an optical signal to the flat optical waveguide 16, and is connected with the second edge face 16b. Center lines that extend through the centers of the channel optical waveguides 14 cross at the point C where the input optical waveguide 12 connects to the second edge face 16b.

The straight optical waveguide 24 conducts an optical signal that propagates through the channel optical waveguide 14, toward the outside of the optical waveguide device 10. Each straight optical waveguide 24 is connected with the channel optical waveguide at the second edge 14b. The width D3 of the straight optical waveguide 24 is constant. Thus, the width D3 is equal to the width D2. The straight optical waveguide 24 is made of single crystal Si as is the optical waveguide structure 18, and has the same approximately 300 nm thickness as the optical waveguide structure 18.

Operation

The optical waveguide device 10 will be described with reference to FIGS. 1A, 1B and 2. In this embodiment, the wavelength of an optical signal that propagates through the optical waveguide device 10 is longer than the width D1 (approximately 330 nm) and the width of the clearance gap 15 (approximately 200 nm). For example, the wavelength may be approximately 1.55 μm.

The optical signal that is input to the flat optical waveguide 16 through the input optical waveguide 12 propagates toward the first edge face 16a and spreads outwardly by diffraction. The optical signal after reaching the first edge face 16a is partitioned equally into the channel optical waveguides 14 and the clearance gaps 15. A first part of the propagating optical signal may be partitioned into the channel optical waveguides 14 and propagate through them. A second part of the optical signal may become partitioned into the clearance gaps 15 and leak to the upper clad layer 22 arranged between the channel optical waveguides 14.

The width D of each of the channel optical waveguides 14 gradually increases as the distance from the flat optical waveguide 16 increases. A normal mode of the channel optical waveguide 14 gradually changes as the width D increases. As a result, an optical signal that is partitioned into the clearance gaps 15 and is therefore between the channel optical waveguides 14, may eventually propagate inside of the channel optical waveguides 14 because of the width D increasing. For instance, the second part of the propagating optical signal may become aligned with the inside of one of the channel optical waveguides 14 as the width D increases. Therefore, the second propagating optical signal merges into the first propagating optical signal in the channel optical waveguide 14. Then the merged optical signal propagates along the channel optical waveguide 14. In some embodiments, the length and the width D of the channel optical waveguides 14 may be selected so that the second optical signal is merged near one or more of the centers of the channel optical waveguides 14 along their respective lengths. Also, the portion of the second propagating optical signal that propagates into the upper clad layer 22 decreases along the optical propagation direction T. The merged propagating optical signal propagates through the straight optical waveguide 24 toward of the optical waveguide device 10.

Next, optimization of the width D of the channel optical waveguide 14 will be described with reference to FIG. 2. FIG. 2 graphically illustrates a two-dimensional light intensity distribution at the one edge face 16a. The horizontal axis shows the distance (measured in μm) from the vertical center line of the first edge face. A left vertical axis shows the distance from the horizontal center line of the first edge face 16a micrometers (μm). A right vertical axis shows a light intensity of the output signal at the one edge face 16a against the input optical signal of the flat optical waveguide 16. If the light intensity is identical to the input optical signal, the value of the light intensity is "1".

If the width D1 is sufficiently narrower than the wavelength of the optical signal, the second propagating optical signal excited by the normal mode at the one edge face 16a is larger than the first propagating optical signal excited by the normal mode at the one edge face 16a.

Figure 2:
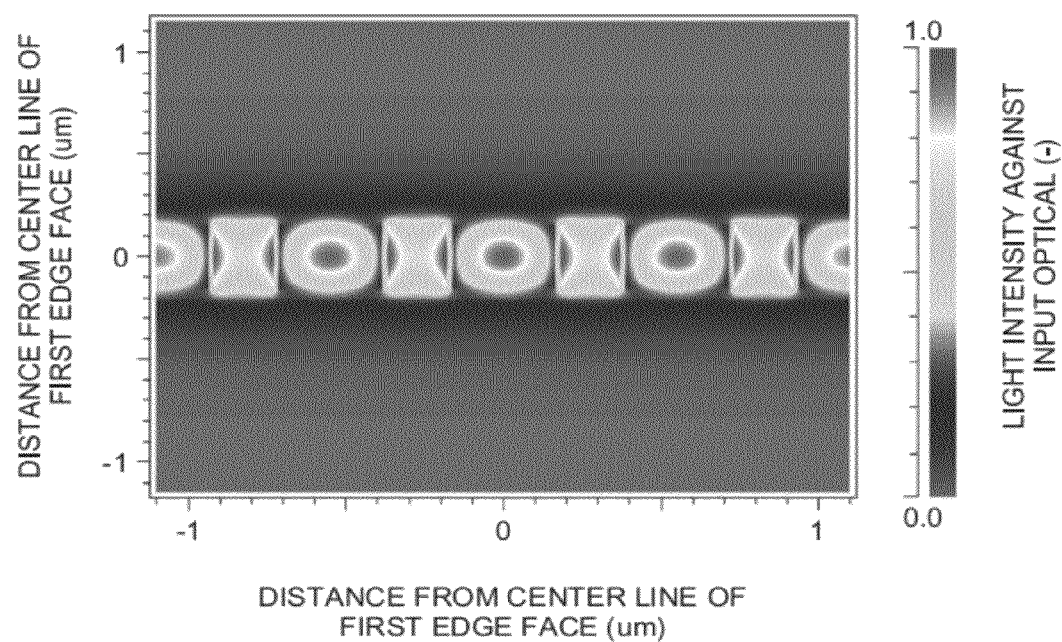
FIG. 2 illustrates a two-dimensional optical intensity distribution at a first edge face of a flat optical waveguide.

In FIG. 2, a light intensity distribution illustrated by oval corresponds to the channel optical waveguides 14, and a light intensity distribution illustrated in a near tetragon shape corresponds to the clearance gap 15. The width D1 is approximately 330 nm and the clearance gap 15 is approximately 200 nm. The wavelength of the propagating optical signal is 1.55 μm.

In the normal mode of the channel optical waveguides 14, the peak value of an optical signal intensity in the channel optical waveguides 14 is nearly equal to the peak intensity illustrated at the clearance gaps 15. If the optical intensity is integrated based on the result of FIG. 2, the integral values at the bonding face of the channel optical waveguides 14 and the one edge face 16a is nearly equal to that of the clearance gaps 15.

Accordingly, the optical signal that is input to the flat optical waveguide is distributed equally to the channel optical waveguides 14 and the clearance gaps 15 in the normal mode of the channel optical waveguides 14. Also when the optical signal corresponds to the normal mode of the flat optical waveguide 16, not only the optical signal to the channel optical waveguides 14, but also the optical signal to the clearance gaps 15 are excited in the flat optical waveguide 16.

Therefore, if a channel optical waveguide that has a suitable width D1 is connected with the flat optical waveguide 16, the normal mode of the flat optical waveguide 16 matches that of the channel optical waveguide 14 successfully. As a result, an optical signal may propagate through the flat optical waveguide 16 toward the channel optical waveguides 14 with low loss. Also, the optical signal leakage from the clearance gaps 15 may be absorbed by the channel optical waveguides 14. Therefore, it may be possible to decrease loss of optical signal while it propagates through the flat optical waveguide 16 toward the channel optical waveguides 14.

Simulation

Figure 3:
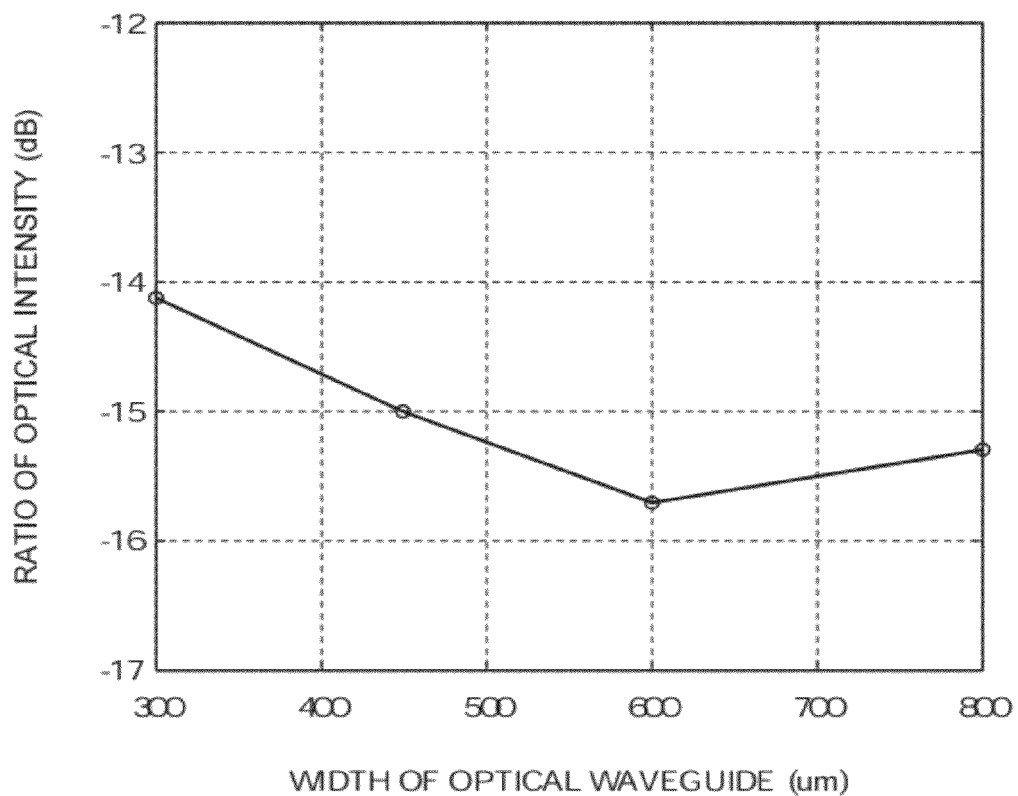
FIG. 3 illustrates the result of a simulation of operation of the optical waveguide device.

A simulation of operation of the optical waveguide device 10 will be described with reference to FIG. 3. FIG. 3 illustrates the result of a simulation of use of the optical waveguide device 10. Values along the vertical axis correspond to the ratio of a summation of the output optical intensity of all of the channel optical waveguides 14 to an input optical intensity of the input optical waveguide 12. Values along the horizontal axis correspond to the width D1 (measured in nm).

The simulation is executed by a three-dimensional Finite Difference Time Domain (FDTD) method. The parameters of the simulation will be described.

In FIG. 3, the width of the clearance gap 15 is 200 nm, and the width D1 ranges from 300 nm to 800 nm. The width D2 at the side not connected with the flat optical waveguide 16 is 800 nm. The lengths, or distances along optical signal propagation direction T, of the waveguides 14 are inversely proportional to the width D1, and range from 0 nm to 2000 nm. Thus, if the width D1 is 300 nm, the length of the channel optical waveguide 14 is 2000 nm, and, if the width D1 is 800 nm, the length of the channel optical waveguide 14 is 0 nm.

In this simulation, the number of the channel optical waveguides 14 is thirty-two. The length $R_s$ is the distance from a connecting point of the input optical waveguide 12 at the edge face 16b to the edge face 16a, and is measured in the optical signal propagating direction T. The length $R_s$ ranges from 1500 nm to 3100 nm and is proportional to the width D1 so as to stabilize the optical signal intensity of the signals that are input to the channel optical waveguides 14. In one example, if the width D1 is 300 nm, the length $R_s$ is 1500 nm. In another example, if the width D1 is 800 nm, the length $R_s$ is 3100 nm. The optical signal intensity is observed at approximately 20 μm from the beginning point of the straight optical waveguide 24 in a direction of propagation of the signal.

According to FIG. 3, if the width D1 is between 300 nm and 450 nm, the ratio of the optical intensity is between −15 dB and −14 dB, and produces the lowest loss of the optical signal. This range represents less loss by about 0.7 dB to 1.7 dB than at D1=600 nm, which has a ratio of approximately −15.7 dB.

Thus, it may be possible to decrease loss of the optical signal while the optical signal propagates through the flat optical waveguide 16 toward the channel optical waveguides 14, by optimization of the width D1 and the width of the clearance gaps 15.

Other Variation

Figure 4:
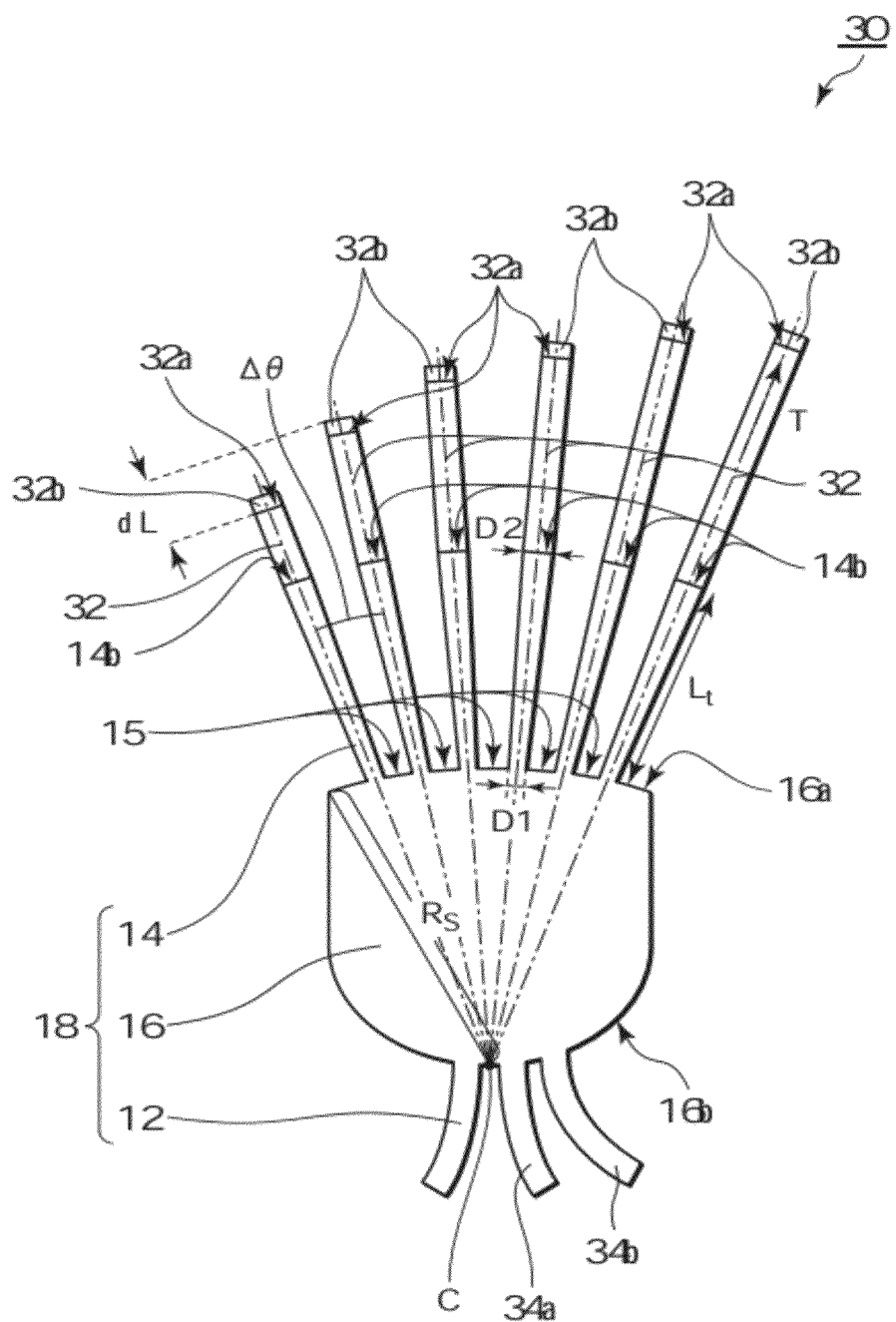
FIG. 4 is a plan view that illustrates a general composition of a wavelength selective device of a variation of the optical waveguide device of FIGS. 1A and 1B.
Figure 5:
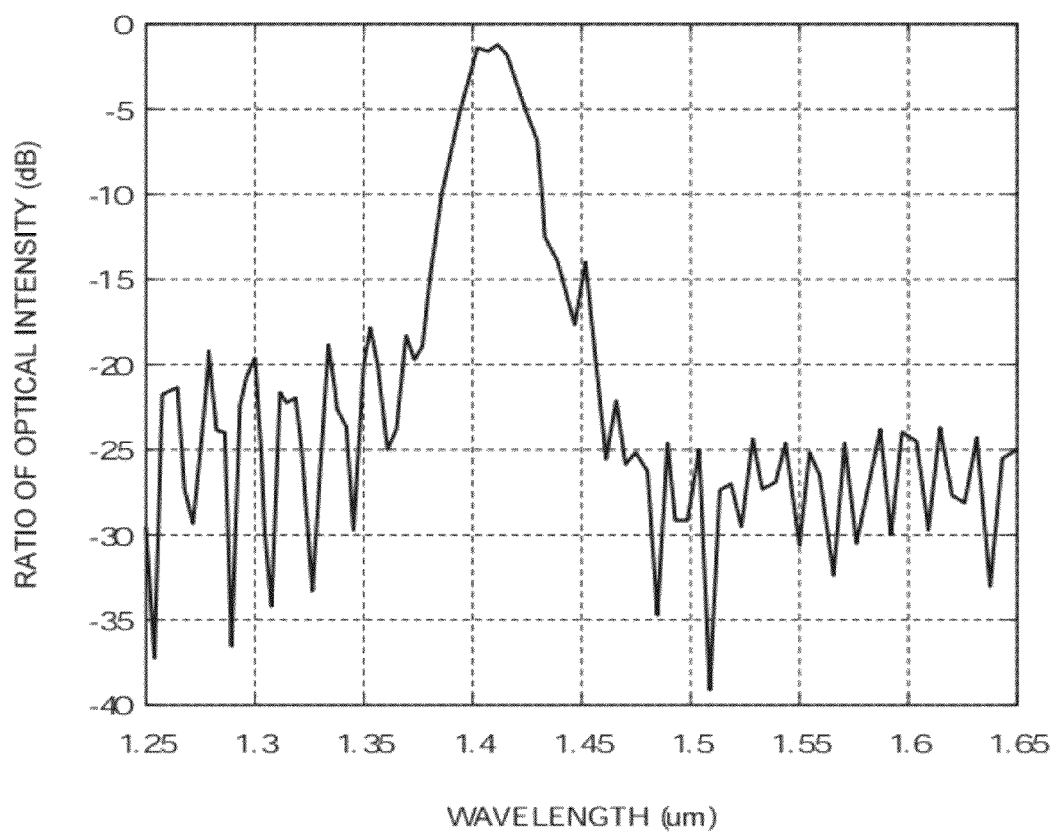
FIG. 5 illustrates the result of a simulation of operation of the wavelength selective device of FIG. 4.

A variation of the optical waveguide device that operates as a wavelength selective device will be described with reference to FIG. 4 and FIG. 5. FIG. 4 is a plan view that illustrates the general composition of a wavelength selective device 30. FIG. 5 illustrates a simulation result of the wavelength selective device 30. In FIG. 4, elements identical to those of FIG. 1 will be designated by the same reference numbers of FIG. 1, and an explanation thereof will be omitted. In FIG. 4, diagrammatic representations of a substrate 20 and the upper clad layer 22 also are omitted.

The wavelength selective device 30 has a full reflection coating 32b serving as an optical reflector arranged at the edge of each of the straight optical waveguides 32. In contrast, the straight optical waveguides 24 in the optical waveguide device 10 described above do not have such a reflection coating. The length of each of the straight optical waveguide 24 is different when compared with that of the straight optical waveguides 32. For instance, as illustrated in FIG. 4, the straight optical waveguides 32 have different lengths. When viewed from left to right, the successive straight optical waveguides 32 have increasing length. The increases in length between successive adjacent straight optical waveguides 32 may be uniform. The differences between the optical waveguide device 10 and the wavelength selective device 30 will be described.

An edge of the straight optical waveguides 32 that is not connected with the channel optical waveguide 14 may be coated with the full reflecting coating 32b. The full reflecting coating 32b may be constituted by Gold (Au) or Aluminum (Al) serving as an optical reflector.

A single input optical waveguide 12, a first output optical waveguide 34a, and a second output optical waveguide 34b are arranged at the second edge face 16b. An optical signal that will be selected propagates through the input optical waveguide 12 toward the flat optical waveguide 16. The first output optical waveguide 34a and the second output optical waveguide 34b each emit of an optical signal having a wavelength different than the other. One of the emitted optical signals is selected based upon the wavelength of the signal.

The simulation was executed by dimensional of two-dimensional FDTD method. In the simulation, the refractive index of the $SiO_2$ that configures the membrane coating is 1.44. The equivalent refractive index of the optical waveguide structure 18, the first output optical waveguide 34a, the second output optical waveguide 34b, and the straight optical waveguide 32 is 3.04.

The length $R_s$ of the flat optical waveguide 16 is 25 μm. $R_s$ is the distance from the cross point C where the center lines of the optical channel waveguides 14 cross each other, to the one edge face 16a. The distance $L_t$ along optical propagating direction T is 20 μm, and is measured from the one edge face 16a to the edge 14b. The width D1 is 300 nm, and the width of the clearance gap 15 is 200 nm. The width D2 of the optical waveguide 14 is 540 nm.

In an embodiment, thirty-two channel optical waveguides 14 are respectively connected to the flat optical waveguide 16. In the straight optical waveguides 32, the difference dL between the lengths of two immediately adjacent or neighboring straight optical waveguides 32 is approximately 509.5 nm. An angular interval Δθ between the centers of the two neighboring channel optical waveguides 14 is approximately 1.146°. The full reflection coating 32b is made by the Al.

Next, the ratio of the output optical intensity to the input optical intensity is calculated for a white input optical signal. The white optical signal is input from the input optical waveguide 12. An optical signal, divided out from the white light input optical signal, is selected based upon the wavelength. The selected wavelength is an output optical signal that is emitted from the output optical waveguide 34a. In this case, the selected wavelength is approximately 1.41 μm.

In FIG. 5, the vertical axis shows a ratio of the intensity of the output optical signal and input optical signal. The horizontal axis shows the wavelength (measured in μm) of an emitted optical signal. The peak of the optical intensity is approximately −1.1 dB when the wavelength is approximately 1.41 μm. That is, the loss of the optical signal by the wavelength selective device 30 is approximately 1.1 dB when the wavelength is approximately 1.41 μm. The input loss of the "Arrayed Waveguide Grating (AWG)" that does not institute measures against the optical leakage from the clearance gaps 15 is approximately 4 dB at approximately 1.41 μm, as is known in the art. Therefore, the wavelength selective device 30 may decrease the optical leakage from the clearance gaps 15 so as to increase the intensity of the output optical signal by approximately 3 dB.

As described above, the optical waveguide structure 18 may include the channel optical waveguides 14 whose widths, measured between sides of the waveguides 14 that are perpendicular to the principal surface 20a, gradually increase in a direction away from the flat optical waveguide 16. Therefore, the part of the propagating optical signal aligned with the inside of the channel optical waveguides 14 is merged into the propagating optical signal in the channel optical waveguides 14 as the distance from the flat optical waveguide 16 increases. In addition, structure may decrease loss of the propagation of the optical signal as a whole, because the value of integral of the optical signal intensity in the channel optical waveguides 14 at the first edge face 16a is equal to that in the clearance gaps 15. Thus, the optical waveguide devices 10 and 30 may decrease the optical leakage, even though the optical waveguide device is easily produced by a process that does not require processing in the direction of width of the substrate.

What is claimed is:

1. An optical waveguide, comprising:
   a substrate;
   an upper clad layer arranged on the substrate; and
   an optical waveguide structure, disposed in the upper clad layer so as to be parallel to a surface of the substrate, and including
      a flat optical waveguide having a first edge face and a second edge face at respective opposite sides thereof,
      channel optical waveguides each connected with said first edge face and extending radially therefrom, the channel optical waveguides each having lateral sides perpendicular to said substrate surface, the lateral sides of each channel optical waveguide being spaced apart from each other by a distance that increases with increasing distance from the first edge face, and
      an input optical waveguide connected with the second edge face,
      wherein the value of an integral of an optical intensity measured at bonding faces that bond the flat optical waveguide and the channel optical waveguides is the same to a value of an integral of an optical intensity measured at clearance gaps that are disposed at the first edge face and between the channel optical waveguides and the first edge face.

2. The optical waveguide of claim 1, wherein the flat optical waveguide and one of the channel optical waveguides are bonded together at a bonding face that is perpendicular to said substrate surface and has a width parallel to said substrate surface that is less than the wavelength of an optical signal that propagates through the optical waveguide device.

3. The optical waveguide of claim 1, wherein the channel optical waveguides have center lines that cross each other at a center point of a bonding face of the input optical waveguide and the second edge face.

4. The optical waveguide of claim 1, wherein each input optical waveguide has lateral sides that are perpendicular to said substrate surface and uniformly spaced apart.

5. An optical waveguide, comprising:
   a substrate;
   an upper clad layer arranged on the substrate; and an optical waveguide structure, disposed in the upper clad layer so as to be parallel to a surface of the substrate, and including
 a flat optical waveguide having a first edge face and a second edge face at respective opposite sides thereof,
 channel optical waveguides each connected with said first edge face and extending radially therefrom, the channel optical waveguides each having lateral sides perpendicular to said substrate surface, the lateral sides of each channel optical waveguide being spaced apart from each other by a distance that increases with increasing distance from the first edge face, and
 an input optical waveguide connected with the second edge face,
 wherein the distance by which the lateral sides of each channel optical waveguide are spaced from each other is 300 nm at said first edge face and 800 nm at an opposite end thereof,
 wherein clearance gaps are formed between the channel optical waveguides at said first edge face, each of the clearance gaps having a width of 200 nm,
 wherein each of the channel optical waveguides has a length of 2000 nm, and
 wherein the distance from a center point of the second edge face to the first edge face is 1500 nm.

6. The optical waveguide of claim 5, wherein each of the channel optical waveguides has a first end positioned at a bonding face that bonds the respective channel optical waveguide and the flat optical waveguide, and a second end disposed opposite the first end, further comprising straight optical waveguides that are each connected with a respective one of the channel optical waveguides at the second end thereof, the straight optical waveguides increasing in length from one side of the optical waveguide to another, the straight optical waveguides each having uniformly spaced lateral sides perpendicular to said substrate surface, and the straight optical waveguides each having an end coated with a fully reflecting coating.

* * * * *